(12) United States Patent
Kafle et al.

(10) Patent No.: US 10,129,892 B2
(45) Date of Patent: Nov. 13, 2018

(54) TECHNIQUES TO MANAGE REVERSE CHANNEL AUDIO SESSIONS

(71) Applicant: QUALCOMM Incorporated, San Diego, CA (US)

(72) Inventors: Padam Lal Kafle, San Diego, CA (US); Vijay Naicker Subramaniam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 15/164,710

(22) Filed: May 25, 2016

(65) Prior Publication Data

US 2016/0353428 A1 Dec. 1, 2016

Related U.S. Application Data

(60) Provisional application No. 62/169,353, filed on Jun. 1, 2015.

(51) Int. Cl.
*H04W 72/04* (2009.01)
*H04N 21/41* (2011.01)
(Continued)

(52) U.S. Cl.
CPC ....... *H04W 72/048* (2013.01); *H04L 65/1069* (2013.01); *H04L 65/4084* (2013.01);
(Continued)

(58) Field of Classification Search
CPC .............. H04L 65/4084; H04L 65/608; H04N 21/4122
See application file for complete search history.

(56) References Cited

U.S. PATENT DOCUMENTS

2007/0286196 A1* 12/2007 Fan ...................... H04W 72/085
370/392
2008/0005310 A1* 1/2008 Xu ....................... H04L 12/2812
709/224
(Continued)

FOREIGN PATENT DOCUMENTS

WO WO-2014189715 A2 11/2014

OTHER PUBLICATIONS

ISA/EP, International Search Report and Written Opinion of the International Searching Authority, Int'l App. No. PCT/US2016/034432, dated Aug. 9, 2016, European Patent Office, Rijswijk, NL, 13 pgs.

(Continued)

*Primary Examiner* — Shukri Taha
(74) *Attorney, Agent, or Firm* — Holland & Hart LLP/Qualcomm

(57) ABSTRACT

Methods, systems, apparatuses, and devices are described for reverse channel audio (RCA) session establishment and management. A sink device may identify a unidirectional communication channel with a source device. The sink device may determine that a trigger is present, where the trigger is associated with a RCA transmission to the source device, and establish a RCA session for transmitting the RCA transmission to the source device based at least in part on the identified trigger. A source device may identify a unidirectional communication channel with a sink device and receive an indication that a sink device supports RCA transmissions, such as via the unidirectional communication channel. The source device may transmit a trigger to the sink device to initiate the RCA transmission, such as via the unidirectional communication channel, and receive the RCA transmission from the sink device based at least in part on the trigger.

22 Claims, 7 Drawing Sheets

200

(51) Int. Cl.
    *H04N 21/422*     (2011.01)
    *H04N 21/414*     (2011.01)
    *H04W 76/30*     (2018.01)
    *H04W 76/15*     (2018.01)
    *H04L 29/06*     (2006.01)
    *H04N 21/4363*     (2011.01)

(52) U.S. Cl.
    CPC ........ *H04L 65/4092* (2013.01); *H04L 65/608* (2013.01); *H04N 21/4122* (2013.01); *H04N 21/41407* (2013.01); *H04N 21/42203* (2013.01); *H04N 21/42207* (2013.01); *H04N 21/43637* (2013.01); *H04W 76/15* (2018.02); *H04W 76/30* (2018.02)

(56) References Cited

U.S. PATENT DOCUMENTS

| | | | | |
|---|---|---|---|---|
| 2009/0245345 | A1* | 10/2009 | Lee | .......................... H04N 5/44 |
| | | | | 375/240.01 |
| 2010/0026790 | A1* | 2/2010 | Ohba | ...................... G09G 5/006 |
| | | | | 348/51 |
| 2014/0210693 | A1 | 7/2014 | Bhamidipati et al. | |
| 2015/0249698 | A1* | 9/2015 | Vedula | .................. H04L 65/608 |
| | | | | 709/219 |

OTHER PUBLICATIONS

WI-FI Alliance, "Wi-Fi Alliance Miracast™: Extending the Wi-Fi Experience to Seamless Video Display," Sep. 19, 2012, 18 pgs., URL: http://www.wi-fi.org/system/files/wp_Miracast_Industry_20120919.pdf, Wi-Fi Alliance, www.wi-fi.org.

\* cited by examiner

TECHNIQUES TO MANAGE REVERSE CHANNEL AUDIO SESSIONS

CROSS REFERENCES

The present Application for Patent claims priority to U.S. Provisional Patent Application No. 62/169,353 by Kafle et al., entitled "Techniques to Manage Reverse Channel Audio Sessions," filed Jun. 1, 2015, assigned to the assignee hereof.

BACKGROUND

The present disclosure, for example, relates to wireless communication systems, and more particularly to techniques to manage reverse channel audio sessions.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

A mobile device may desire to share content with other mobile devices and other devices such as TVs, computers, audio systems, and the like. Typically one device (i.e., a source device) may wirelessly stream content to another device (i.e., a sink device) for presentation. The source device may transmit the content over a unidirectional Wi-Fi peer-to-peer wireless link or over an infrastructure wireless link. In some applications, the sink device may benefit from streaming audio content to the source device in addition to the content (audio and/or video) streaming from the source device to the sink device, e.g., bi-directional voice communications, voice command control of applications from the sink device (e.g., navigation with voice control), voice calls where the dial-pad/user interface is displayed at the sink, voice calls with Wi-Fi headsets, etc. However, conventional methods of streaming content to sink devices lack means for supporting reverse channel audio session establishment, management, and teardown.

SUMMARY

The described features generally relate to one or more improved systems, methods, and/or apparatuses for supporting reverse channel audio (RCA) sessions in a situation where a source device is streaming content to a sink device via a unidirectional communication channel. In accordance with the present disclosure, a sink device may determine or otherwise identify that it is communicating with a source device via a unidirectional communication channel. The sink device may determine or otherwise identify a trigger associated with RCA transmission to the source device, e.g., a trigger initiated or activated by the sink device (or a secondary sink device, e.g., headset connected to the sink device) or a trigger received from the source device. The sink device may initiate the RCA transmission based on the trigger and via the unidirectional communication channel. For example, the sink device and the source device may exchange message(s) to identify supported RCA transmission parameters and initiate the RCA transmission once the RCA session is established. The sink device may, alone or in cooperation with the source device, tear down the RCA transmission session once the RCA transmission is complete.

At the source device, the source device may determine or otherwise receive information indicating that the sink device supports RCA transmissions, e.g., via capabilities exchange messaging with the sink device. In some applications, the source device may transmit or otherwise convey a trigger to the sink device to initiate the RCA transmission via the unidirectional communication channel. The source device may then begin to receive the RCA transmission based on the transmitted trigger. The source device may, alone or in cooperation with the sink device, tear down the RCA transmission session once the RCA transmission is complete.

A method of wireless communication is described. The method may include identifying a unidirectional communication channel with a source device, determining that a trigger is present, wherein the trigger is associated with a reverse channel audio transmission to the source device, and establishing a reverse channel audio session for transmitting the reverse channel audio transmission to the source device based at least in part on the trigger.

An apparatus for wireless communication is described. The apparatus may include means for identifying a unidirectional communication channel with a source device, means for determining that a trigger is present, wherein the trigger is associated with a reverse channel audio transmission to the source device, and means for establishing a reverse channel audio session for transmitting the reverse channel audio transmission to the source device based at least in part on the trigger.

Another apparatus for wireless communication is described. The apparatus may include a processor, memory in electronic communication with the processor, and instructions stored in the memory. The instructions may be operable to cause the processor to identify a unidirectional communication channel with a source device, determine that a trigger is present, wherein the trigger is associated with a reverse channel audio transmission to the source device, and establish a reverse channel audio session for transmitting the reverse channel audio transmission to the source device based at least in part on the trigger.

A non-transitory computer readable medium for wireless communication is described. The non-transitory computer-readable medium may include instructions operable to cause a processor to identify a unidirectional communication channel with a source device, determine that a trigger is present, wherein the trigger is associated with a reverse channel audio transmission to the source device, and establish a reverse channel audio session for transmitting the reverse channel audio transmission to the source device based at least in part on the trigger.

In some examples of the method, apparatus, or non-transitory computer-readable medium described above, determining that the trigger is present comprises: receiving a first request message from the source device comprising a request for reverse channel audio transmission parameters supported by the source device.

Some examples of the method, apparatus, or non-transitory computer-readable medium described above may further include processes, features, means, or instructions for sending a response message to the source device conveying an indication of the supported reverse channel audio transmission parameters.

Some examples of the method, apparatus, or non-transitory computer-readable medium described above may further include processes, features, means, or instructions for receiving a second request message from the source device conveying an indication of at least one of the supported reverse channel audio transmission parameters. Some examples of the method, apparatus, or non-transitory computer-readable medium described above may further include processes, features, means, or instructions for sending a confirmation message to the source device, wherein establishing the reverse channel audio session comprises establishing the reverse channel audio session according to the at least one supported reverse channel audio transmission parameter.

In some examples of the method, apparatus, or non-transitory computer-readable medium described above, determining that the trigger is present comprises: receiving a signal from at least one of an application being executed on the sink device, or a user input on the sink device, or a voice command received at the sink device.

Some examples of the method, apparatus, or non-transitory computer-readable medium described above may further include processes, features, means, or instructions for transmitting a first request message to the source device, the first request message comprising a request to setup a reverse channel audio session, the first request message comprising one or more transmission parameters associated with an input type, a transport type, and a preferred audio format supported by the sink device.

Some examples of the method, apparatus, or non-transitory computer-readable medium described above may further include processes, features, means, or instructions for receiving a response message from the source device, the response message conveying an indication of reverse channel audio transmission parameters supported by the source device. Some examples of the method, apparatus, or non-transitory computer-readable medium described above may further include processes, features, means, or instructions for selecting at least one of the supported reverse channel audio transmission parameters. Some examples of the method, apparatus, or non-transitory computer-readable medium described above may further include processes, features, means, or instructions for receiving a second request message from the source device, the second request message conveying an indication of the at least one supported reverse channel audio transmission parameter, wherein establishing the reverse channel audio session comprises establishing the reverse channel audio session according to the at least one supported reverse channel audio transmission parameter.

Some examples of the method, apparatus, or non-transitory computer-readable medium described above may further include processes, features, means, or instructions for receiving a session teardown request message from the source device. Some examples of the method, apparatus, or non-transitory computer-readable medium described above may further include processes, features, means, or instructions for tearing down the reverse channel audio session with the source device according to the session teardown request message.

Some examples of the method, apparatus, or non-transitory computer-readable medium described above may further include processes, features, means, or instructions for transmitting a session teardown request message to the source device. Some examples of the method, apparatus, or non-transitory computer-readable medium described above may further include processes, features, means, or instructions for tearing down the reverse channel audio session with the source device according to the session teardown request message.

In some examples of the method, apparatus, or non-transitory computer-readable medium described above, the unidirectional communication channel comprises a Wi-Fi display (WFD) Miracast session.

In another set of illustrative examples, an apparatus for wireless communication is provided. The apparatus may include: a session manager for identifying a unidirectional communication channel with a source device; a trigger manager for determining that a trigger is present, where the trigger is associated with a reverse channel audio transmission to the source device; and a reverse channel audio transmission manager for establishing a reverse channel audio session for transmitting the reverse channel audio transmission to the source device based at least in part on the identified trigger.

In some aspects, the trigger manager for determining the trigger is present is further for receiving a first request message from the source device comprising a request for reverse channel audio transmission parameters supported by the source device. The trigger manager is further for sending a response message to the source device conveying an indication of the supported reverse channel audio transmission parameters. The trigger manager is further: for receiving a second request message from the source device conveying an indication of at least one of the supported reverse channel audio transmission parameters; and for sending a confirmation message to the source device, where establishing the reverse channel audio session includes establishing the reverse channel audio session according to the at least one supported reverse channel audio transmission parameter.

In some aspects, the trigger manager for determining the trigger is present is further for receiving a signal from at least one of an application being executed on the sink device, or a user input on the sink device, or a voice command received at the sink device. The trigger manager is further for transmitting a first request message to the source device, the first request message comprising a request to setup a reverse channel audio session, the first request message comprising one or more transmission parameters associated with an input type, a transport type, and a preferred audio formats supported by the sink device. The trigger manager is further: for receiving a response message from the source device, the response message conveying an indication of the reverse channel audio transmission parameters supported by the source device; for selecting at least one of the supported reverse channel audio transmission parameters; and for receiving a second request message from the source device, the second request message conveying an indication of the at least one supported reverse channel audio transmission parameter, where establishing the reverse channel audio session includes establishing the reverse channel audio session according to the at least one supported reverse channel audio transmission parameter.

In some aspect, the reverse channel audio transmission manager is further: for receiving a session teardown request message from the source device; and for tearing down the reverse channel audio session with the source device according to the session teardown request message. The reverse channel audio transmission manager is further: for transmitting a session teardown request message to the source device; and for tearing down the reverse channel audio session with the source device according to the session teardown request message.

A method of wireless communication is described. The method may include identifying a unidirectional communication channel with a sink device, receiving an indication that the sink device supports reverse channel audio transmissions, transmitting a trigger to the sink device to initiate a reverse channel audio transmission, and receiving the reverse channel audio transmissions from the sink device based at least in part on the trigger.

An apparatus for wireless communication is described. The apparatus may include means for identifying a unidirectional communication channel with a sink device, means for receiving an indication that the sink device supports reverse channel audio transmissions, means for transmitting a trigger to the sink device to initiate a reverse channel audio transmission, and means for receiving the reverse channel audio transmissions from the sink device based at least in part on the trigger.

Another apparatus for wireless communication is described. The apparatus may include a processor, memory in electronic communication with the processor, and instructions stored in the memory. The instructions may be operable to cause the processor to identify a unidirectional communication channel with a sink device, receive an indication that the sink device supports reverse channel audio transmissions, transmit a trigger to the sink device to initiate a reverse channel audio transmission, and receive the reverse channel audio transmissions from the sink device based at least in part on the trigger.

A non-transitory computer readable medium for wireless communication is described. The non-transitory computer-readable medium may include instructions operable to cause a processor to identify a unidirectional communication channel with a sink device, receive an indication that the sink device supports reverse channel audio transmissions, transmit a trigger to the sink device to initiate a reverse channel audio transmission, and receive the reverse channel audio transmissions from the sink device based at least in part on the trigger.

In some examples of the method, apparatus, or non-transitory computer-readable medium described above, transmitting the trigger comprises: transmitting a first request message to the sink device, the first request message comprising a request for reverse channel audio transmission parameters supported by the sink device.

Some examples of the method, apparatus, or non-transitory computer-readable medium described above may further include processes, features, means, or instructions for receiving a response message from the sink device conveying an indication of supported reverse channel audio transmission parameters.

Some examples of the method, apparatus, or non-transitory computer-readable medium described above may further include processes, features, means, or instructions for transmitting a second request message to the sink device conveying an indication of at least one of the supported reverse channel audio transmission parameters. Some examples of the method, apparatus, or non-transitory computer-readable medium described above may further include processes, features, means, or instructions for receiving a confirmation message from the source device. Some examples of the method, apparatus, or non-transitory computer-readable medium described above may further include processes, features, means, or instructions for receiving the reverse channel audio transmission according to the at least one supported reverse channel audio transmission parameter.

Some examples of the method, apparatus, or non-transitory computer-readable medium described above may further include processes, features, means, or instructions for receiving a session teardown request message from the sink device. Some examples of the method, apparatus, or non-transitory computer-readable medium described above may further include processes, features, means, or instructions for tearing down the reverse channel audio transmission session with the sink device according to the session teardown request message.

Some examples of the method, apparatus, or non-transitory computer-readable medium described above may further include processes, features, means, or instructions for transmitting a session teardown request message to the sink device. Some examples of the method, apparatus, or non-transitory computer-readable medium described above may further include processes, features, means, or instructions for tearing down the reverse channel audio transmission session with the sink device according to the session teardown request message.

In some examples of the method, apparatus, or non-transitory computer-readable medium described above, the unidirectional communication channel comprises a Wi-Fi display (WFD) Miracast session.

In another set of illustrative examples, an apparatus for wireless communication is provided. The apparatus may include: a session manager for identifying a unidirectional communication channel with a sink device; the session manager for receiving an indication that the sink device supports reverse channel audio transmissions, such as via a unidirectional communication channel; a trigger manager for transmitting a trigger to the sink device to initiate a reverse channel audio transmission, such as via the unidirectional communication channel; and a reverse channel audio transmission manager for receiving the reverse channel audio transmissions from the sink device based at least in part on the trigger.

In some aspects, the trigger manager is further for transmitting a first request message to the sink device, the first request message comprising a request for reverse channel audio transmission parameters supported by the sink device. The trigger manager is further for receiving a response message from the sink device conveying an indication of the supported reverse channel audio transmission parameters. The trigger manager is further: for transmitting a second request message to the sink device conveying an indication of at least one of the supported reverse channel audio transmission parameters; for receiving a confirmation message from the source device; and for receiving the reverse channel audio transmission according to the at least one supported reverse channel audio transmission parameter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described embodiments are directed to systems and methods for session establishment and management for reverse channel audio (RCA) transmissions in an environment that supports audio transmission from the sink device to the source device. The described enhancements provide flexible setup and control of the RCA session. Triggering of the RCA session setup from the sink device and/or the source device is considered along with providing an indication of desired or supported audio format and transport selection to meet application or use case requirements. Indication of RCA parameter support for the purpose of bi-directional voice or any other audio inputs allows the source device and the sink device to manage the latency and buffer requirements of audio streaming, as needed for the particular use case. For example, in certain voice inputs scenarios such as for voice recognition, error resiliency may rate higher in importance than latency, therefore requiring reliable transport such as transmission control protocol (TCP) and high-fidelity audio formats. Similarly, in some bi-directional voice use cases, low-latency transport mode such as user datagram protocol (UDP) but relatively low bit rate audio codec may be sufficient and supported.

Therefore, aspects of the present description provide for RCA session setup and management by the source device and the sink device. For example, a sink device may identify that it is communicating with a source device via a unidirectional communication channel. The sink device may identify a trigger associated with RCA transmission to the source device, e.g., a trigger initiated or activated by the sink device or a trigger received from the source device. The sink device may initiate the RCA transmission based on the trigger and via the unidirectional communication channel. At the source device, the source device may receive information indicating that the sink device supports RCA transmissions, e.g., via capabilities exchange messaging with the sink device. In some applications, the source device may transmit or otherwise convey a trigger to the sink device to initiate the RCA transmission via the unidirectional communication channel. The source device may then begin to receive the RCA transmission based on the transmitted trigger.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
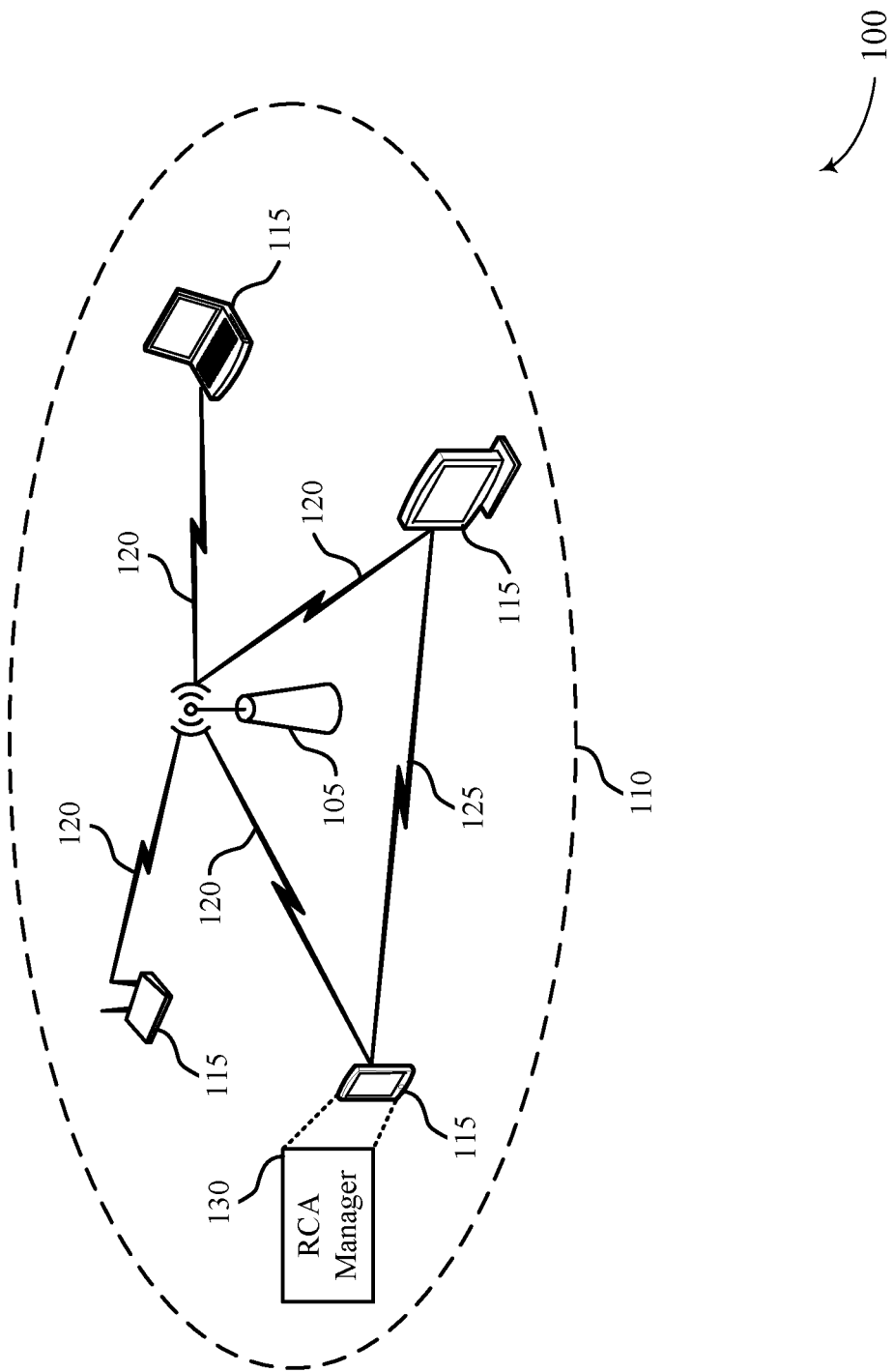
FIG. 1 shows a block diagram of a wireless communication system, in accordance with various aspects of the present disclosure.

Referring first to FIG. 1, a block diagram illustrates an example of a WLAN network 100. The WLAN network 100 may include an access point (AP) 105 and one or more wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN network 100 may have multiple APs 105. Each of the wireless stations 115, which may also be referred to as mobile stations (MSs), mobile devices, access terminals (ATs), user equipment (UE), subscriber stations (SSs), or subscriber units, may associate and communicate with an AP 105 via a communication link 120. Each AP 105 has a geographic coverage area 110 such that wireless stations 115 within that area can typically communicate with the AP 105. The wireless stations 115 may be dispersed throughout the geographic coverage area 110. Each wireless station 115 may be stationary or mobile.

Although not shown in FIG. 1, a wireless station 115 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. A geographic coverage area 110 for an access point 105 may be divided into sectors making up only a portion of the coverage area (not shown). The WLAN network 100 may include access points 105 of different types (e.g., metropolitan area, home network, etc.), with varying sizes of coverage areas and overlapping coverage areas for different technologies. Although not shown, other wireless devices can communicate with the AP 105.

While the wireless stations 115 may communicate with each other through the AP 105 using communication links 120, each wireless station 115 may also communicate directly with one or more other wireless stations 115 via a direct wireless link 125. Two or more wireless stations 115 may communicate via a direct wireless link 125 when both wireless stations 115 are in the AP geographic coverage area 110 or when one or neither wireless station 115 is within the AP geographic coverage area 110 (not shown). Examples of direct wireless links 125 may include Wi-Fi Direct connections (also known as peer-to-peer (P2P) connections), connections established by using a Wi-Fi Tunneled Direct Link Setup (TDLS) link, and other P2P group connections. The wireless stations 115 in these examples may communicate according to the WLAN radio and baseband protocol including physical and media access control (MAC) layers. In other implementations, other peer-to-peer connections and/or ad hoc networks may be implemented within WLAN network 100.

In some examples, one or more of wireless stations 115 may be configured as a source device and/or a sink device. For example, a source device (e.g., first wireless station 115) may be connected to a sink device (e.g., a second wireless station 115) via a unidirectional communication channel or link that may be a wireless link in some embodiments. Communications between a source device and a sink device, connected via a wireless peer-to-peer connection, may be configured to remotely render content of the source device at the sink devices. In some examples, the unidirectional communication link between the source device and the sink device may allow users to launch applications stored on the source device via the sink device. For example, the sink devices may include various input controls (e.g., mouse, keyboard, knobs, keys, user interface buttons). These controls may be used at the sink device to initialize and interact during the audio/video streaming from the source through the media applications stored on the source device.

In some examples, the source device may be connected to the sink device via a Wi-Fi Display connection. Wi-Fi Display protocol, which may be known as Miracast® by Wi-Fi alliance, allows a portable device or computer to transmit media content (e.g., video, audio, images, etc.) to a compatible receiving device (or a display) wirelessly. It enables delivery of compressed standard, high-definition, or ultra-high definition video content along with audio in various formats over a unidirectional communication link. It also may allow users to echo the display from one device onto the display of another device. It should be noted that the unidirectional communication link may be unidirectional in nature based on a subset of communications. For example, a unidirectional communication link may be able to transmit media content (e.g., video, audio, images, etc.) in one direction (i.e., from the source to the sink), while allowing for control signal transmission in multiple directions (e.g., from the source to the sink, from the sink to the source, etc.). In some cases, a unidirectional communication link may provide communications in only one direction (i.e., from the source to the sink). At times, a control link and/or a RCA link may be present in addition to a unidirectional communication link. The unidirectional communication link may be a direct wireless link (e.g., peer-to-peer link), or an indirect wireless link through a Wi-Fi access point 105. Examples of direct wireless links include Wi-Fi Direct connections and connections established by using a Wi-Fi Tunneled Direct Link Setup (TDLS) link. Additionally, wireless remote display may also include, but is not limited to the Wi-Fi Display specification, also known as, Discovery and Launch (DIAL), Digital Living Network Alliance® (DLNA), Airplay, WirelessHD, Wireless Home Digital Interface (WHDI), Intel's Wireless Display (Wi-Di) technology, MirrorLink technology, and Ultra-wideband (UWB) connections.

Thus, in accordance with the present disclosure, WLAN network 100 may support techniques for managing audio sessions on a reverse channel. A sink device, e.g., a first wireless station 115 configured to act as a sink device, may identify a unidirectional communication channel with a source device. Similarly, a source device, e.g., a second wireless station 115 configured to act as a source device, may identify a unidirectional communication channel with a sink device. The unidirectional communication channel may be a Miracast channel, in some examples. The sink device may determine that a trigger associated with RCA transmissions to the source device has been activated, e.g., activated by the sink device or the source device. In some examples, the trigger may be associated with one or more capabilities or parameter support messages exchanged between the sink device and the source device. The sink device may initiate the RCA transmission to the source device based on the trigger being identified or detected. For example, the sink device may send one or more packets containing audio information to the source device.

A source device, e.g., a second wireless station 115 configured to act as a source device, may receive an indication that the sink device supports RCA transmissions via the unidirectional communication channel, e.g., an indication that the sink device generally supports RCA transmissions, an indication of various parameters for RCA transmission supported by the sink device, and the like. The sink device may send a trigger to the source device to initiate the RCA transmission via the unidirectional communication channel and then receive the RCA transmission from the sink device based on the trigger. Accordingly, the present disclosure provides protocol enhancements to allow flexible setup and control of RCA session that supports various use cases requiring audio from the sink device.

Although the present description generally discusses reverse channel audio communications, it is to be understood that the present disclosure is not limited to providing audio via the reverse channel. Instead, aspects of the present disclosure may provide for video, data, control signaling, etc., being communicated via the reverse channel.

Figure 2:
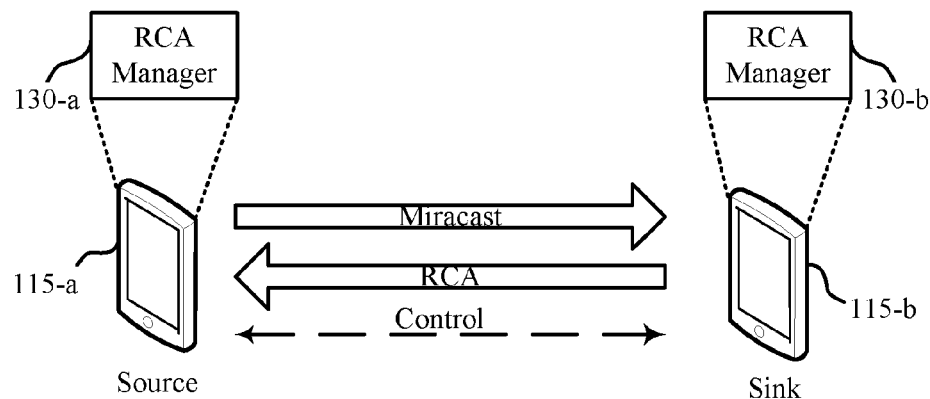
FIG. 2 shows a block diagram of a wireless communication subsystem, in accordance with various aspects of the present disclosure.

FIG. 2 illustrates an example of a wireless communications subsystem 200 that supports RCA transmission session setup and management in accordance with various aspects of the present disclosure. Wireless communications subsystem 200 may be an example of aspects of WLAN network 100 described with reference to FIG. 1. Wireless communications subsystem 200 may include a source device 115-a and a sink device 115-b. The source device 115-a and/or sink device 115-b may be examples of the wireless station 115 described with reference to FIG. 1. Generally, the source device 115-a and the sink device 115-b may be wirelessly connected via a unidirectional communication channel that communicates aspects of a Miracast link, a RCA link, and optionally a control link.

Source device 115-a may include a RCA manager 130-a and sink device 115-b may include a RCA manager 130-b. The RCA manager 130-a and/or RCA manager 130-b may be examples of the RCA manager 130 described with reference to FIG. 1. It is to be understood that either or both of the RCA managers 130-a and 130-b may be configured to perform the functions of a source device or a sink device, dependent upon the configuration of the associated wireless station.

Generally, wireless communications subsystem 200 may support the sink device 115-*b* triggering initiation of an RCA session based on user's interaction at a user interface (UI) on the sink device 115-*b* and/or based on detection of certain events (e.g., push to talk button or phone call button integrated into the sink device 115-*b* or via a unique voice code/pattern to trigger voice commands). To provide flexibility for specific applications or use cases requiring RCA transmissions, the source device 115-*a* or the sink device 115-*b* may trigger the RCA session, may indicate the desired parameters associated with the RCA session, and/or may terminate the RCA session after its use. In some aspects, device and service discovery between the source device 115-*a* and the sink device 115-*b* may detect or otherwise provide an indication of support for RCA capability for bi-directional voice or RCA for other voice inputs. The sink device 115-*b* may trigger setup of the RCA session based on its user interface or other triggering events requiring the RCA session. The sink device 115-*b* may indicate the desired parameters for the RCA sessions, e.g., by including the audio codec and transport parameter and type of RCA session to the source device 115-*a* when sending the trigger request. The source device 115-*a* may initiate additional capability exchange if the prior capability exchange has not included the parameters for RCA capability. The source device 115-*a* or the sink device 115-*b* may tear down the RCA session based on which side detects the need of terminating the RCA.

In some aspects, when a device (e.g., source device 115-*a* and/or sink device 115-*b*) supports RCA, the device may advertise such capability by setting the RCA Support for Bi-directional Voice and RCA Support for Other Voice Inputs bits of the WFD Extended Capability bitmap, and by including it in the service_information parameter when invoking the service discovery request.

In some aspects, the Miracast link may include transmitting audio, video, or audio and video content from the source device 115-*a* to the sink device 115-*b*. Audio content may be transmitted via the RCA link from the sink device 115-*b* to the source device 115-*a*. Control information including one or more messages may also be communicated via the control link between the source device 115-*a* and the sink device 115-*b*. In some aspects, the RCA link may utilize packetization format for the audio streams using, for example, the moving picture experts group (MPEG) 2 transport stream (MPEG2-TS) container format and encapsulated by real-time transport protocol (RTP)/UDP/IP headers, similar to techniques utilized for the Miracast link (e.g., the forward channel).

In some aspects, RCA session may be established for other voice inputs (and therefore reverse audio transmissions), e.g., voice recognition. For example, device/service discovery functions may include setting a voice input bit associated with RCA support. For example, one or more bits or information elements of a real-time streaming protocol (RTSP) message may provide a capability to indicate audio formats supported for the voice input. A trigger for the RCA session for voice input may be provided from the source device 115-*a* or the sink device 115-*b*. In some examples, the sink device 115-*b* may send an RTSP SET_PARAMETER request message with desired audio codec, type of RCA session, and desired transport (UDP or TCP). The source device 115-*a* may perform additional capability exchange if necessary to query the sink device 115-*b*, e.g., to determine additional parameters supported for RCA sessions. In some examples, the source device 115-*a* may decide the parameters to be used for the RCA session and set up the RCA session with the sink device 115-*b*. If the source device 115-*a* has received a trigger from the sink device 115-*b* for establishing the RCA session, the source device 115-*a* may use the parameters indicated by the sink device 115-*b*. Algorithms to detect the triggering of voice inputs at the sink device 115-*b* may be implementation specific (e.g., some key-word voice phrase or dedicated button for PTT). Once the RCA session is setup, the sink device 115-*b* may make its microphone available to capture the voice audio, and send the audio to the source device 115-*a* in the format negotiated for the RCA session.

In some aspects, the RCA session may be established for bi-directional audio, e.g., a voice call RCA session. For example, device/service discovery may be used by setting a voice bit to indicate RCA support for bi-directional voice transmissions. One or more bits or information elements of a RTSP capability message may indicate audio formats supported for bi-directional voice. Trigger of RCA session for bi-directional voice may be initiated from the source device 115-*a* or the sink device 115-*b*. The sink device 115-*b* may send a RTSP SET_PARAMETER request message with the desired audio codec, type of RCA session, and desired transport (UDP or TCP). The source device 115-*a* may perform additional capability exchange if necessary. In some examples, the source device 115-*a* may determine the parameters to be used for setting up the RCA.

Thus, one or more aspects of wireless communications subsystem 200 may provide protocol enhancements to allow flexible setup and control of RCA sessions so that various use cases requiring audio from the sink device 115-*b* can be supported, e.g., in Miracast. Indication of RCA capability support for the purpose of bi-directional voice or any other audio inputs allows the source device 115-*a* and the sink device 115-*b* to handle the latency and buffer requirements of audio stream as needed for the particular use case.

Figure 3:
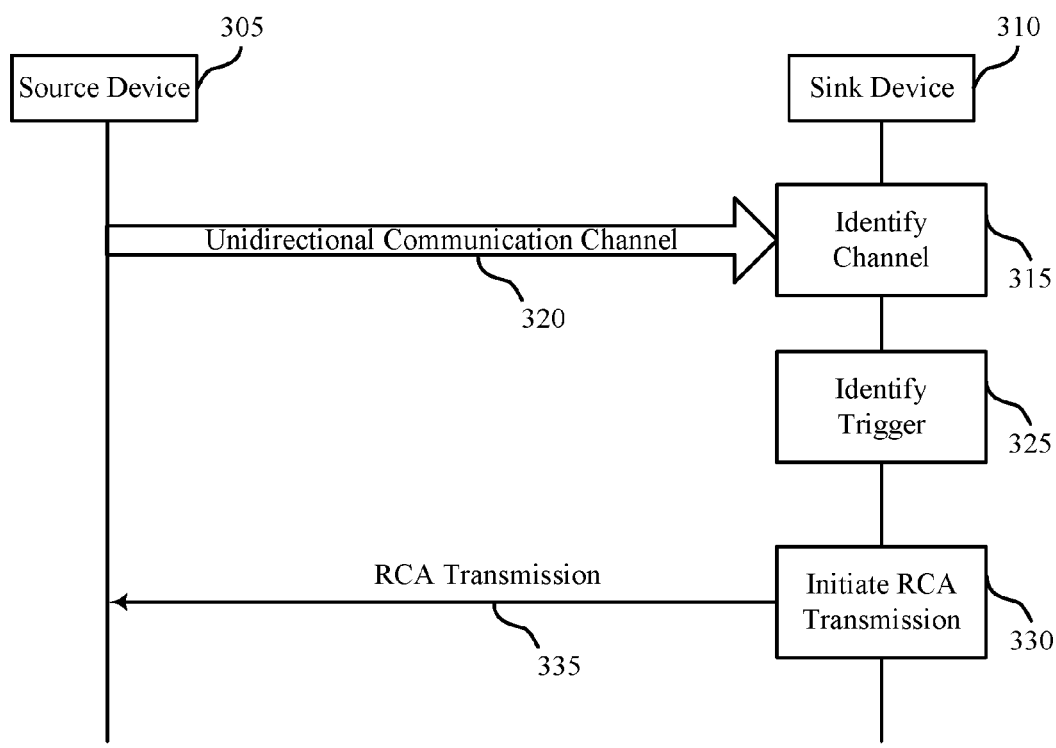
FIG. 3 shows a process flow diagram illustrating aspects of wireless communication, in accordance with various aspects of the present disclosure.

FIG. 3 illustrates an example of a process flow 300 for wireless communication in accordance with various aspects of the present disclosure. Process flow 300 may include a source device 305, which may be an example of a source device 115 described with reference to FIGS. 1-2. Process flow 300 may also include a sink device 310, which may be an example of a sink device 115 described above with reference to FIGS. 1-2. Generally, the process flow 300 may provide for RCA session establishment and management.

At 315, the sink device 310 may identify a unidirectional communication channel 320 that is communicating with the source device 305. The unidirectional communication channel 320 may be a channel associated with a WFD Miracast session, such as is described with reference to FIG. 2. The unidirectional communication channel 320 may provide for audio, video, or audio plus video streaming from the source device 305 to the sink device 310. In some examples, various RCA parameters supported by the sink device 310 and/or the source device 305 may be exchanged during establishment of the unidirectional communication channel 320.

At 325, the sink device 310 may determine that a trigger associated with RCA transmission to the source device 305 is present. The sink device 310 may identify the trigger based on one or more messages received from the source device 305 (e.g., a RTSP SET_PARAMETER Request message) or based on a trigger being initiated on the sink device 310 (e.g., based on user input on the sink device 310). The RCA session may be established based on the identified trigger. For example, a request for supported RCA transmission parameters may be included in a RTSP SET_PARAMETER Request message and a RTSP SET_PARAMETER Response message may convey an indication of the selected or preferred RCA parameters, e.g., the input type, the transport type, the audio format, etc. The RCA session may be established using the selected RCA parameters.

At 330, the sink device 310 may initiate the RCA transmission and send an RCA transmission 335 to the source device 305. In some aspects, the sink device 310 may initiate the RCA transmission after a confirmation message associated with the selected RCA parameters is received or transmitted, depending upon which device initiated the RCA session. The RCA transmission 335 may include audio information packetized in a manner consistent with the packetization scheme utilized on the forward link, e.g., the link used to stream the content from the source device 305 to the sink device 310.

Figure 4:
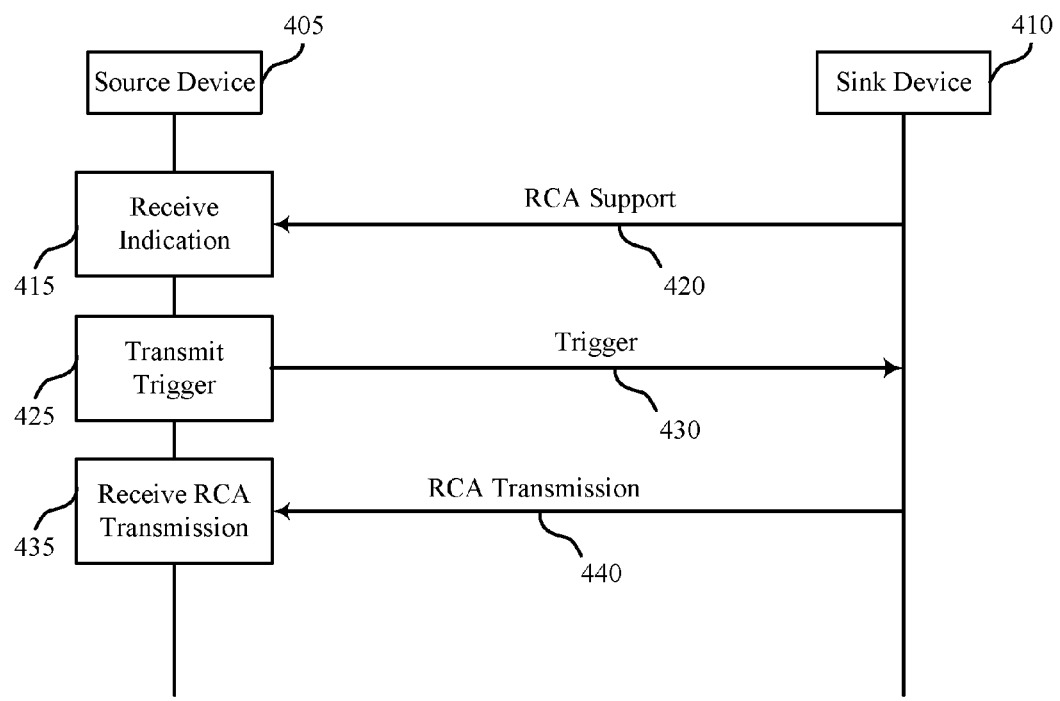
FIG. 4 shows a process flow diagram illustrating aspects of wireless communication, in accordance with various aspects of the present disclosure.

FIG. 4 illustrates an example of a process flow 400 for wireless communication in accordance with various aspects of the present disclosure. Process flow 400 may include a source device 405, which may be an example of any one of the source devices 115 or 305 described with reference to FIGS. 1-3. Process flow 400 may also include a sink device 410, which may be an example of any one of the sink devices 115 or 310 described above with reference to FIGS. 1-3. Generally, the process flow 400 may provide for RCA session establishment and management.

At 415, the source device 405 may receive an indication that the sink device 410 supports RCA transmissions via a unidirectional communication channel. The unidirectional communication channel may be a channel associated with a WFD Miracast session. The unidirectional communication channel may provide for audio, video, or audio plus video streaming from the source device 405 to the sink device 410. The source device 405 may receive the indication of RCA support 420 via at least one of an RTSP SET_PARAMETER Request/Response message. The RCA support 420 parameters may include an input type, a transport type, an audio format type, etc.

At 425, the source device 405 may transmit a trigger 430 to the sink device 410. The trigger 430 may initiate RCA session establishment which may include message exchanges to select the RCA support parameters for the RCA session.

At 435, the source device 405 may receive the RCA transmission 440 from the sink device 410. In some aspects, the sink device 410 may send the RCA transmission after a confirmation message associated with the selected RCA parameters is received or transmitted, depending upon which device initiated the RCA session. The RCA transmission 440 may include audio information packetized in a manner consistent with the packetization scheme utilized on the forward link, e.g., the link used to stream the content from the source device 405 to the sink device 410.

Figure 5:
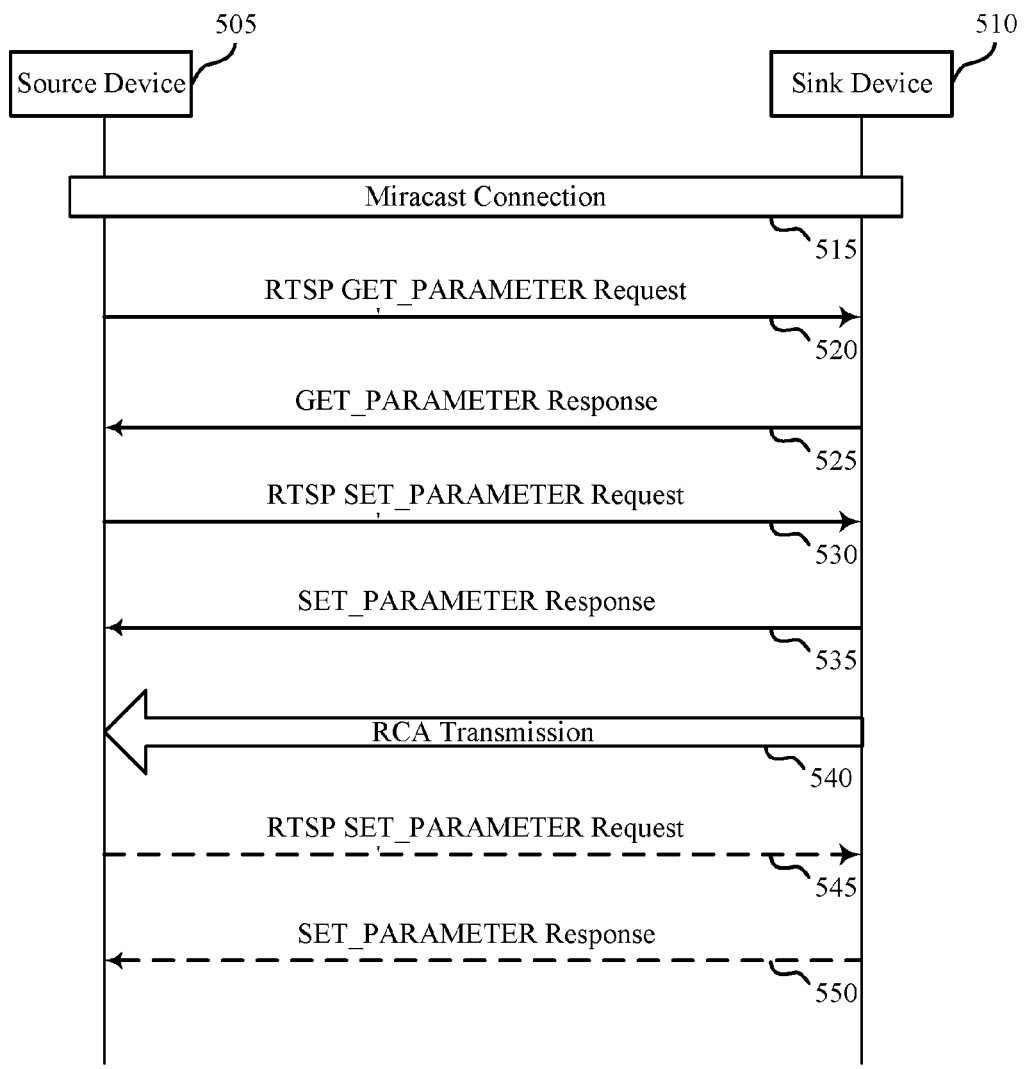
FIG. 5 shows a process flow diagram illustrating aspects of wireless communication, in accordance with various aspects of the present disclosure.

FIG. 5 illustrates an example of a process flow 500 for wireless communication in accordance with various aspects of the present disclosure. Process flow 500 may include a source device 505, which may be an example of any one of source devices 115, 305, and 405 described with reference to FIGS. 1-4. Process flow 500 may also include a sink device 510, which may be an example of any one of sink devices 115, 310, and 410 described above with reference to FIGS. 1-4. Generally, the process flow 500 illustrates aspects of RCA session establishment and management.

At 515, the source device 505 and the sink device 510 may be in a Miracast session that includes a Miracast connection. The Miracast session may be established by negotiating a connection between the source device 505 and the sink device 510. In some examples, one or both of the source device 505 and/or sink device 510 may broadcast their support and availability for Miracast session. The other device may receive the broadcast and initiate one or more message exchanges to establish the connection for the Miracast session.

In some aspects, in order to start RCA session, source device 505 and sink device 510 may establish a RCA session. The establishment of the RCA session may be performed by using the RTSP GET_PARAMETER and SET_PARAMETER messages. At 520, the source device 505 may send a RTSP GET_PARAMETER Request message to the sink device 510. For example, when the source device 505 supports RCA, the source device 505 may include the wfd2-rca-audio-formats parameter in the RTSP M3 Request (RTSP GET_PARAMETER Request) message. At 525, the sink device 510 may respond by sending a GET_PARAMETER Response message to the source device 505. For example, if the sink device 510 supports RCA and receives the RTSP M3 Request message that contains the wfd2-rca-audio-formats parameter, the sink device 510 may respond with the RTSP M3 Response message that contains the wfd2-rca-audio-formats parameter indicating the supported format(s), i.e., the RCA parameters the sink device 510 supports. In the situation where the sink device 510 is not capable of supporting RCA and receives the RTSP M3 Request message that contains the wfd2-rca-audio-formats parameter, the sink device 510 may respond with the RTSP M3 Response message that contains the wfd2-rca-audio-formats parameter set to indicate "none" to convey the indication that RCA is not supported (not shown).

At 530, the source device 505 may send a RTSP SET_PARAMETER Request message to the sink device 510. For example, the source device 505 may include the wfd2-rca-audio-formats parameter choosing one format to be used within the sink device's 510 capability indicated in RTSP M3 Response message (i.e., selecting one RCA parameter supported by the sink device 510) and also the wfd2-reverse-channel-rtp-port parameter with identifying RTP port number and a transport mechanism (i.e., TCP or UDP) in the RTSP M4 or M17 Request message. At 535, the sink device 510 may respond by sending a SET_PARAMETER Response message to the source device 505. For example, when the sink device 510 supports RCA and receives the RTSP M4 or M17 Request message that contains the wfd2-rca-audio-formats parameter and the wfd2-reverse-channel-rtp-port parameter, the sink device 510 may respond with the RTSP M4 or M17 Response message respectively indicating an appropriate status code.

In some aspects, the above-described capability negotiation for RCA may be performed during the initial Wi-Fi Display (WFD) session establishment (e.g., during a Miracast connection setup) using M3 and M4 request/response messages or anytime during an ongoing WFD session using M3 and M4 or M17 request/response.

In some aspects, the RTP port number to be used by the source device 505 for receiving the RTP data in the reverse direction may be provided in the wfd2-reverse-channel-rtp-port parameter included in the RTSP M4 and/or M17 request messages. Once the source device 505 sends the RTSP M4 or M17 request message containing parameters to establish RCA including the wfd2-reverse-channel-rtp-port parameter, the TCP or UDP port at the source device 505 may be ready to accept incoming connections from the sink device 510. The source device 505 may select the transport port based on the application requiring RCA or based on the transport being used in the forward direction. When the RTP data carrying audio in the reverse channel is sent over TCP transport, each RTP packet may be framed according to standards or request for comments (RFC) 4571.

In some aspects, including the wfd2-rca-audio-formats parameter in the RTSP M3 request message may provide for the source device 505 to indicates that it supports the RCA feature, and sink device 510 may respond with the M3 response if it can support the feature along with the details for the supported audio formats. During the initial capability negotiation or after the WFD session has been established, the source device 505 may initiate the RCA session to enable streaming of audio based on the need of its audio application. In other examples, the sink device 510 may initiate the RCA session to enable streaming of audio.

Although not shown in FIG. 5, in some examples wherein the sink device 510 desires to trigger establishment of the RCA session, the sink device 510 may send the M18 Request (RTSP SET_PARAMETER Request message) including the wfd2-rca-control parameter with the rca_control field set to "setup_request" along with the audio_input the sink device 510 intends to use. The sink device 510 may include wfd2-rca-audio-formats parameter with the audio format it intends to use for the RCA session. The sink device 510 may also include the wfd2-reverse-channel-rtp-port parameter to indicate the type of transport profile (UDP or TCP) it prefers to use for the RCA session. After the source device 505 responds with the M18 response with RTSP OK, the source device 505 may continue setup of the RCA session with the sink device 510. In some examples where the prior capability exchange messaging with the sink device 510 has not included RCA capability parameters, the source device 505 may send M3-RTSP GET_PARAMETER Request (wfd2_rca_audio_formats) parameters to query the RCA audio formats supported by the sink device 510 to trigger the RCA session establishment.

When the source device 505 needs to activate the RCA session, the source device 505 may send the M4 or M17 request (RTSP SET_PARAMETER request) in which the audio format parameter is set based on the audio formats the sink device 510 is capable of supporting (i.e., capable to encode the audio in the specified formats) along with the transport port information in the wfd2-reverse-channel-rtp-port parameter. If the source device 505 desires to change the audio format of the ongoing RCA session, the source device 505 may send a new M4/M17 request message to re-start the RCA session that shall include the desired audio format in the wfd2-rca-audio-formats parameter.

At 540, the sink device 510 may send the RCA transmissions to the source device 505 according to the RCA session parameters. For example, once the RCA session has been established, the same transport connection (UDP or TCP) between the source device 505 and the sink device 510 may be used for that RCA session. In some aspects, the sink device 510 may packetize audio elementary streams using a MPEG2-TS container format and encapsulate them by RTP/UDP/internet protocol (IP) or RTP/TCP/IP headers prior to 802.11 packetization. The structure of the RCA Audio frame for the reverse session may follow the same structure as the forward session. Similar MPEG System Layer may be used for transport stream transmitted in the reverse channel as well. A sink device 510 may support multiplexing the audio and/or voice input streams into a single MPEG2 transport stream containing audio/voice payload, as well as program clock reference (PCR) information when it supports audio streaming in the reverse channel.

In some aspects, the MPEG2-TS packets may be packetized using RTP, UDP/TCP and IP headers respectively, except that the MPEG2-TS stream may be obtained from the sink device's 510 codec. A 32-bit RTP time-stamp (RTP TS) information may be derived from the master-clock maintained by the sink device 510, and may be represented in 90 kHz units where one tick corresponds to 11.11 us. The RTP TS for a RCA packet may be set to map to the time of arrival of the first MPEG2-TS packet at the RTP encapsulation layer. There may be a relationship between MPEG2-TS usage and the setting at wfd2-reverse-channel-rtp-port parameter in both RTSP M4 or M17 response and M4 or M17 request messages.

When the sink device 510 transmits audio only content to the source device 505 in the RCA channel, the sink device 510 may transmit a MPEG2-TS containing only an audio only elementary stream with the audio payload in the format that has been negotiated between the source device 505 and sink device 510 in the most recent M4 or M17 Request/Response message exchange.

At 545, the source device 505 may send a RTSP SET_PARAMETER Request message to the sink device 510 to initiate tear down of the RCA session. The RTSP SET_PARAMETER Request message may include wfd2_rca_control: teardown indication to signal that the source device 505 desires to tear down the RCA session. At 550, the sink device 510 may respond by sending a SET_PARAMETER Response message to the source device 505. The SET_PARAMETER Response message may include an "OK" indication that the sink device 510 has torn down the RCA session. After tearing down of the RCA session, a new RCA session may be setup using different transport or audio codec/format as needed for streaming of the audio content in the reverse channel.

Although FIG. 5 shows the source device 505 initiating the RCA session tear down, it is to be understood that the sink device 510 may send the RTSP SET_PARAMETER Request message to initiate RCA session tear down.

Figure 6:
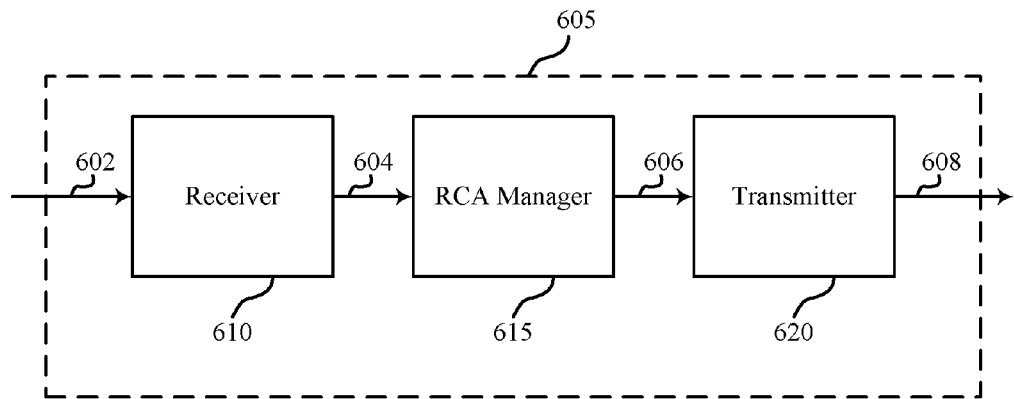
FIG. 6 shows a block diagram of a device configured for use in wireless communication, in accordance with various aspects of the present disclosure.

FIG. 6 shows a block diagram 600 of a wireless device 605 configured for synchronous multimedia content streaming service, in accordance with various aspects of the present disclosure. Wireless device 605 may be an example of aspects of a source device 115 and/or a sink device 115 described with reference to FIGS. 1 and 2. In some examples, wireless device 605 may be an example of a source device 305, 405, and 505 described with reference to FIGS. 3-5. In some examples, wireless device 605 may be an example of a sink device 310, 410, and 510 described with reference to FIGS. 3-5. Wireless device 605 may include a receiver 610, a RCA manager 615, or a transmitter 220. Wireless device 605 may also include a processor. Each of these components may be in communication with each other.

The components of wireless device 605 may, individually or collectively, be implemented with at least one application specific integrated circuit (ASIC) adapted to perform some or all of the applicable functions in hardware, or using another circuit or collection of circuitry. Alternatively, the functions may be performed by one or more other processing units (or cores), on at least one integrated circuit (IC). In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 610 may receive information such as packets, user data, or control information associated with various information channels (e.g., control channels, data channels, and information related to RCA session establishment and management, etc.) over communication link 602. Information may be passed on to the RCA manager 615 via link 604, and to other components of wireless device 605. In some cases, the receiver 610 may include a circuit or circuitry for receiving information over communication link 602.

The RCA manager 615 may monitor, manage, or otherwise control various aspects related to RCA session establishment and management. For example and when the wireless device 605 is utilized as a source (e.g., source device 115, 305, 405, or 505), the RCA manager 615 may identify a unidirectional communication channel with a sink device, such as a WFD Miracast session channel. The RCA manager 615 may receive an indication that a sink device supports RCA transmissions, such as via a unidirectional communication channel, e.g., via a WFD Miracast session channel. The RCA manager 615 may transmit a trigger to the sink device to initiate the RCA transmission, such as via the unidirectional communication channel, and may receive the RCA transmission(s) from the sink device based at least in part on the trigger.

As another example and when the wireless device 605 is utilized as a sink (e.g., sink device 115, 310, 410, 510), the RCA manager 615 may identify the unidirectional communication channel with the source device, e.g., identify the active or initializing WFD Miracast session channel. The RCA manager 615 may determine that a trigger associated with a RCA transmission to the source device is present and/or initiate the RCA transmission to the source device via the unidirectional communication channel based at least in part on the identified trigger. The RCA manager 615 may establish an RCA session for transmitting the RCA transmission to the source device based at least in part on the trigger. In some cases, the RCA manager 615 may include a circuit or circuitry for monitoring, managing, or otherwise controlling various aspects related to RCA session establishment and management.

The transmitter 620 may receive information from RCA manager 615 via link 606 and transmit signals 608 received from other components of wireless device 605. In some embodiments, the transmitter 620 may be collocated with the receiver 610 in a transceiver. The transmitter 620 may include a single antenna, or it may include a plurality of antennas. In some cases, the transmitter 620 may include a circuit or circuitry for receiving information from RCA manager 615 and transmitting signals.

Figure 7:
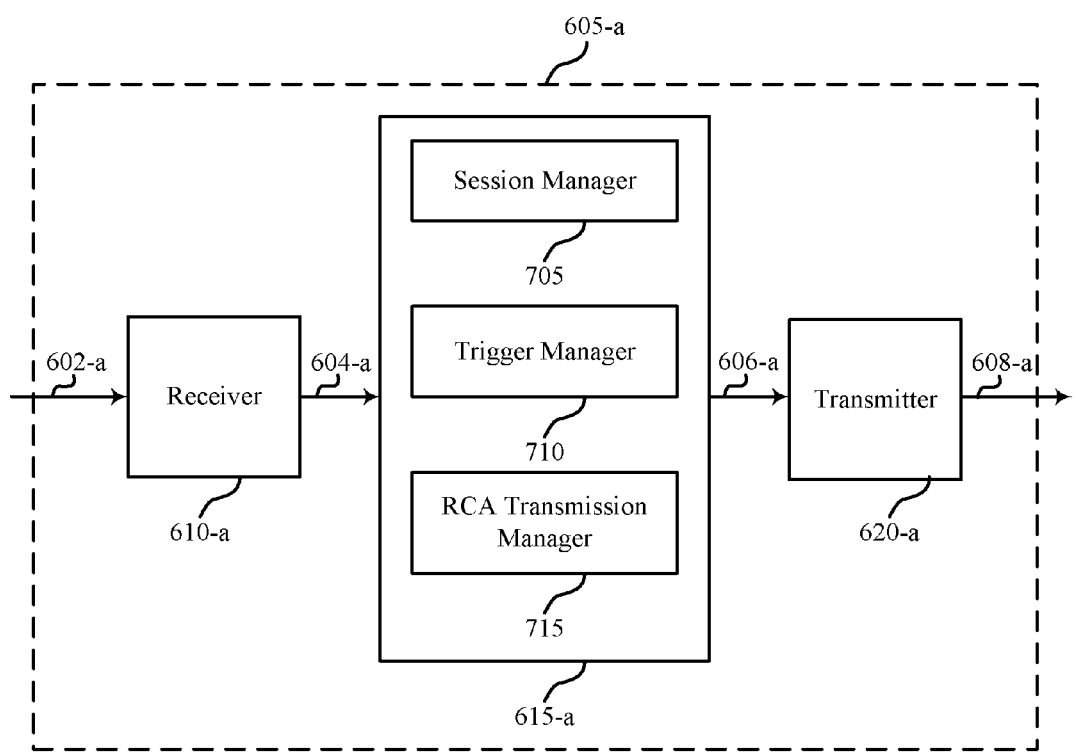
FIG. 7 shows a block diagram of a device configured for use in wireless communication, in accordance with various aspects of the present disclosure.

FIG. 7 shows a block diagram 700 of a wireless device 605-*a* configured for RCA session establishment and management, in accordance with various aspects of the present disclosure. Wireless device 605-*a* may be an example of aspects of a wireless device 605, a source device 115, 305, 405, 505, or a sink device 115, 310, 410, 510 described with reference to FIGS. 1-6. Wireless device 605-*a* may include a receiver 610-*a*, a RCA manager 615-*a*, or a transmitter 620-*a*. Wireless device 605-*a* may also include a processor. Each of these components may be in communication with each other. The receiver 610-*a* and the transmitter 620-*a* may be examples of the receiver 610 and the transmitter 220 of FIG. 6, respectively, and may perform similar function(s). The RCA manager 615-*a* may also include a session manager 705, a trigger manager 710, and a RCA transmission manager 715.

The session manager 705 may monitor, manage, or otherwise control aspects of Miracast session for the wireless device 605-*a*. In one example where the wireless device 605-*a* is utilized as a sink device, session manager 705 may identify a unidirectional communication channel with a source device or a sink device as described with reference to FIGS. 1-5. In some examples where the wireless device 605-*a* is utilized as a source device, the session manager 705 may receive an indication that a sink device supports reverse channel audio transmissions, such as via a unidirectional communication channel, as described with reference to FIGS. 1-5. In some examples, the unidirectional communication channel may be a channel associated with a WFD Miracast session. In some cases, the session manager 705 may include a circuit or circuitry for monitoring, managing, or otherwise controlling various aspects related to RCA session establishment and management.

The trigger manager 710 may monitor, manage, or otherwise control aspects of triggering associated with RCA transmissions for the wireless device 605-*a*. In some aspects where the wireless device 605-*a* is utilized as a sink device, the trigger manager 710 may identify a trigger, or determine that the trigger is present, associated with a reverse channel audio transmission to the source device as described with reference to FIGS. 1-5. In some examples, determining the trigger is present may include receiving a first request message from the source device comprising a request for reverse channel audio transmission parameters supported by the sink device. The trigger manager 710 may also send a response message to the source device conveying an indication of the supported reverse channel audio transmission parameters. The trigger manager 710 may also receive a second request message from the source device conveying an indication of at least one of the supported reverse channel audio transmission parameters. The trigger manager 710 may also send a confirmation message to the source device. The trigger manager 710 may also initiate the reverse channel audio transmission according to the at least one supported reverse channel audio transmission parameter. The trigger manager 710 may also establish a reverse channel audio session for transmitting the reverse channel audio transmission to the source device according to the at least one supported reverse channel audio transmission parameter. In some examples, determining the trigger is present may include receiving a signal, or an indication of the trigger, from at least one of an application being executed on the sink device, or a user input on the sink device, or a voice command received at the sink device.

In some aspects, identifying the trigger, or determining a trigger is present, may include the trigger manager 710 transmitting a first request message to the source device, the first request message comprising a request to setup a reverse channel audio session, the first request message may comprise a transmission parameter associated with an input type, a transport type, and a preferred audio formats supported by the sink device. The trigger manager 710 may also receive a response message from the source device, the response message conveying an indication of the reverse channel audio transmission parameters supported by the source device. The trigger manager 710 may also select at least one of the supported reverse channel audio transmission parameters. The trigger manager 710 may also receive a second request message from the source device, the second request message conveying an indication of the at least one supported reverse channel audio transmission parameter. The trigger manager 710 may also initiate the reverse channel audio transmission according to the at least one supported reverse channel audio transmission parameter. The trigger manager 710 may also establish a reverse channel audio session for transmitting the reverse channel audio transmission to the source device according to the at least one supported reverse channel audio transmission parameter.

In some aspects where the wireless device 605-a is utilized as a source device, the trigger manager 710 may transmit a trigger to the sink device to initiate a reverse channel audio transmission, such as via the unidirectional communication channel. In some examples, transmitting the trigger may include transmitting a first request message to the sink device, the first request message comprising a request for reverse channel audio transmission parameters supported by the sink device. The trigger manager 710 may also receive a response message from the sink device conveying an indication of the supported reverse channel audio transmission parameters. The trigger manager 710 may also transmit a second request message to the sink device conveying an indication of at least one of the supported reverse channel audio transmission parameters. The trigger manager 710 may also receive a confirmation message from the source device. The trigger manager 710 may also receive the reverse channel audio transmission according to the at least one supported reverse channel audio transmission parameter. In some cases, the trigger manager 710 may include a circuit or circuitry for monitoring, managing, or otherwise controlling various aspects related to RCA session establishment and management.

The RCA transmission manager 715 may monitor, manage, or otherwise control one or more aspects of RCA transmissions for the wireless device 605-a. For example and when the wireless device 605-a is utilized as a sink device, the RCA transmission manager 715 may initiate the reverse channel audio transmission to the source device, such as via the unidirectional communication channel, based at least in part on the identified trigger as described with reference to FIGS. 1-5. The RCA transmission manager 715 may establish a reverse channel audio session, such as for transmitting the RCA transmission to the source device based on the trigger. The RCA transmission manager 715 may also receive a session teardown request message from the source device. The RCA transmission manager 715 may also tear down the reverse channel audio transmission session with the source device according to the session teardown request message. The RCA transmission manager 715 may also transmit a session teardown request message to the source device. The RCA transmission manager 715 may also tear down the reverse channel audio transmission session with the source device according to the session teardown request message.

For example and when the wireless device 605-a is utilized as a source device, the RCA transmission manager 715 may receive the reverse channel audio transmissions from the sink device based at least in part on the trigger as described with reference to FIGS. 1-5. The RCA transmission manager 715 may also receive a session teardown request message from the sink device. The RCA transmission manager 715 may also tear down the reverse channel audio transmission session with the sink device according to the session teardown request message. The RCA transmission manager 715 may also transmit a session teardown request message to the sink device. The RCA transmission manager 715 may also tear down the reverse channel audio transmission session with the sink device according to the session teardown request message. In some cases, the RCA transmission manager 715 may include a circuit or circuitry for monitoring, managing, or otherwise controlling various aspects related to RCA session establishment and management.

Figure 8:
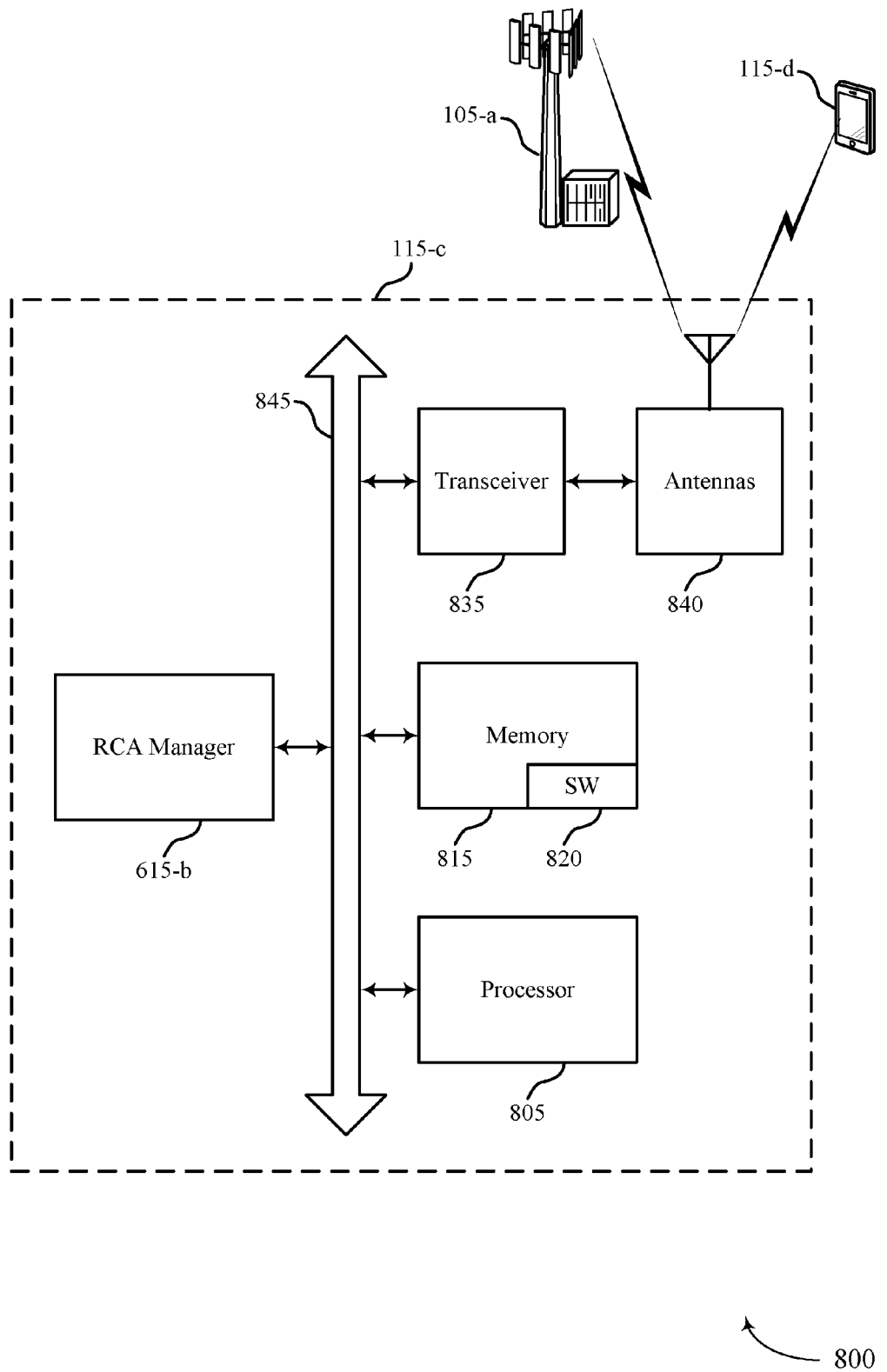
FIG. 8 shows a block diagram of a wireless communication system, in accordance with various aspects of the present disclosure.

FIG. 8 shows a diagram of a system 800 including a wireless device 115-c configured for RCA session establishment and management, in accordance with various aspects of the present disclosure. System 800 may include wireless device 115-c, which may be an example of a wireless station 115, source device 115, 305, 405, 505, and/or sink device 115, 310, 410, 510, described above with reference to FIGS. 1-5. The wireless device 115-c may include a RCA manager 615-b, which may be an example of a RCA manager 615 described with reference to FIGS. 6 and 7. The wireless device 115-c may also include components for bi-directional voice and data communications including components for transmitting communications and components for receiving communications.

The wireless device 115-c may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with access point 105-a or wireless device 115-d, which may be examples of a source device and/or a sink device. The transceiver 835 may include a modem to modulate the packets and provide the modulated packets to the antenna(s) 840 for transmission, and to demodulate packets received from the antenna(s) 840. While wireless device 115-c may include a single antenna 840, wireless device 115-c may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., RCA session establishment and management, etc.). Alternatively, the software/firmware code 820 may not be directly executable by the processor 805 but cause a computer (e.g., when compiled and executed) to perform functions described herein. The processor 805 may include an intelligent hardware device (e.g., a central processing unit (CPU), a microcontroller, an ASIC, etc.). At times, components, for example as shown in FIG. 8, may each include a circuit or circuitry for RCA session establishment and management, in accordance with various aspects of the present disclosure.

Figure 9:
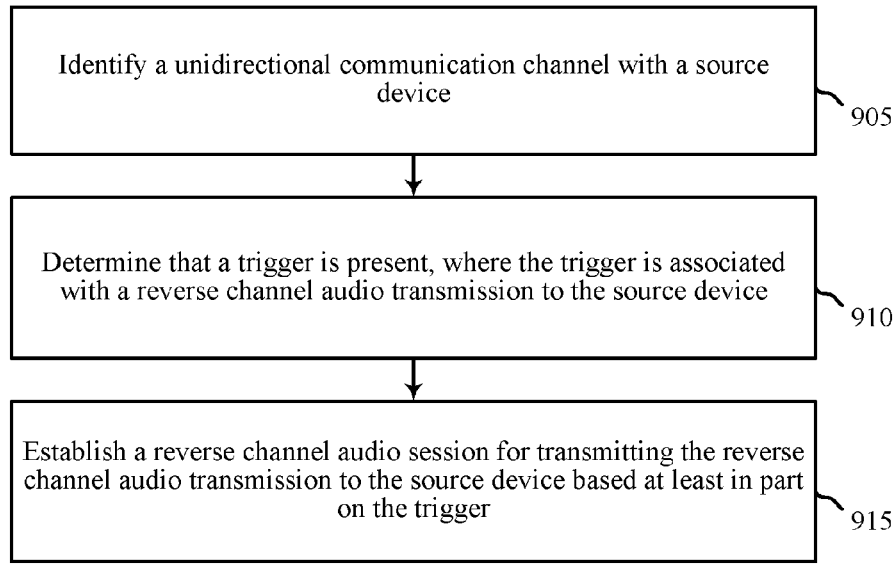
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of a sink device as described with reference to FIGS. 1-8. In some examples, a sink device may execute a set of codes to control the functional elements of the sink device to perform the functions described below. Additionally or alternatively, the sink device may perform the functions described below using special-purpose hardware. Additionally or alternatively, the sink device may perform the functions described below using a circuit or circuitry.

At 905, the method 900 may include the sink device identifying a unidirectional communication channel with a source device as described with reference to FIGS. 1-8. In certain examples, the operations of block 905 may be performed by the session manager 705 as described with reference to FIG. 7.

At 910, the method 900 may include the sink device identifying a trigger associated with a reverse channel audio transmission to the source device as described with reference to FIGS. 1-8. At 910, the method 900 may include the sink device determining that a trigger is present and the trigger may be associated with a reverse channel audio transmission to the source device as described with reference to FIGS. 1-8. In certain examples, the operations of block 910 may be performed by the trigger manager 710 as described with reference to FIG. 7.

At 915, the method 900 may include the sink device establishing a reverse channel audio session for transmitting the reverse channel audio transmission to the source device based on the trigger as described with reference to FIGS. 1-8. At 915, the method 900 may include the sink device initiating the reverse channel audio transmission to the source device via the unidirectional communication channel based at least in part on the identified trigger as described with reference to FIGS. 1-8. In certain examples, the operations of block 915 may be performed by the RCA transmission manager 715 as described with reference to FIG. 7.

Figure 10:
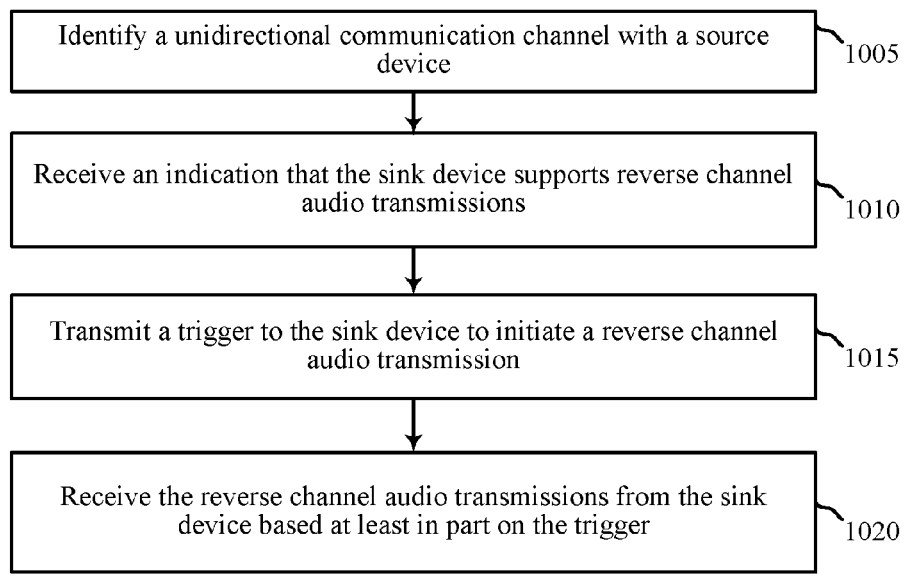
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of a source device described with reference to FIGS. 1-8. In some examples, a source device may execute sets of codes to control the functional elements of the source device to perform the functions described below. Additionally or alternatively, the source device may perform the functions described below using special-purpose hardware. Additionally or alternatively, the source device may perform the functions described below using a circuit or circuitry.

At 1005, the method 1000 may include the source device identifying a unidirectional communication channel with a source device as described with reference to FIGS. 1-8. In certain examples, the operations of block 1005 may be performed by the session manager 705 as described with reference to FIG. 7.

At 1010, the method 1000 may include the source device receiving an indication that the sink device supports reverse channel audio transmission, such as via a unidirectional communication channel, as described with reference to FIGS. 1-8. In certain examples, the operations of block 1010 may be performed by the session manager 705 as described with reference to FIG. 7.

At 1015, the method 1000 may include the source device transmitting a trigger to the sink device to initiate a reverse channel audio transmission, such as via the unidirectional communication channel, as described with reference to FIGS. 1-8. In certain examples, the operations of block 1015 may be performed by the trigger manager 710 as described with reference to FIG. 7.

At 1020, the method 1000 may include the source device receiving the reverse channel audio transmission from the sink device based at least in part on the trigger as described with reference to FIGS. 1-8. In certain examples, the operations of block 1015 may be performed by the RCA transmission manager 715 as described with reference to FIG. 7.

Thus, the methods 900 and 1000 may provide for wireless communication. It should be noted that the methods 900 and 1000 can be just one implementation and that the operations of the methods 900 and 1000 may be rearranged or otherwise modified such that other implementations are possible.

In some examples, aspects from two or more of the methods 900 and/or 1000 may be combined. It should be noted that the methods 900, etc. are just example implementations, and that the operations of the methods 900-1000 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, at least one microprocessor in conjunction with a DSP core, or any other such configuration. Further, in one embodiment, the various illustrative blocks, components, or managers described in connection with the disclosure herein may be implemented or performed using a circuit or circuitry for performing the functions described herein.

The functions described herein may be implemented in hardware, software executed by a processor, firmware, or any combination thereof. If implemented in software executed by a processor, the functions may be stored on or transmitted over as at least one instruction or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection can be properly termed a computer-readable medium. For example, if the software can be transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a sink device, comprising:
    identifying a unidirectional communication channel with from a source device to the sink device, the unidirectional communication channel being associated with a first streaming session from the source device to the sink device:
    receiving a first message from the source device via the unidirectional communication channel;
    transmitting, responsive to receiving the first message, a second message that indicates at least one reverse channel audio transmission parameter supported by the sink device for establishing a reverse channel audio session with the source device;
    establishing the reverse channel audio session for transmitting audio content to the source device based at least in part on the at least one reverse channel audio transmission parameter; and
    streaming the audio content to the source device using the reverse channel audio session.

2. The method of claim 1, wherein receiving the first message comprises:
    receiving a first request message from the source device comprising a request for reverse channel audio transmission parameters supported by the source device.

3. The method of claim 2, further comprising: receiving a second request message from the source device conveying an indication of a selected one of the at least one supported reverse channel audio transmission parameters;
    and transmitting a confirmation message to the source device, wherein establishing the reverse channel audio session based at least in part on the at least one reverse channel audio transmission parameter comprises establishing the reverse channel audio session according to the selected one of the at least one supported reverse channel audio transmission parameters.

4. The method of claim 1, further comprising:
    transmitting a third request message to the source device prior to receiving the first message, the third request message comprising a request to setup the reverse channel audio session, the first request message indicating one or more transmission parameters associated with an input type, a transport type, and a preferred audio format supported by the sink device.

5. The method of claim 1, further comprising: receiving a session teardown request message from the source device; and tearing down the reverse channel audio session with the source device according to the session teardown request message.

6. The method of claim 1, further comprising: transmitting a session teardown request message to the source device;
    and tearing down the reverse channel audio session with the source device according to the session teardown request message.

7. An apparatus for wireless communication at a sink device comprising:
    a processor;
    memory in electronic communication with the processor; and instructions stored in the memory and operable, when executed by the processor, to cause the apparatus to:
    identify a unidirectional communication channel with from a source device to the sink device, the unidirectional communication channel being associated with a first streaming session from the source device to the sink device;
    receive a first message from the source device via the unidirectional communication channel;
    transmit responsive to receiving the first message, a second message that indicates at least one reverse channel audio transmission parameter supported by the sink device for establishing a reverse channel audio session with the source device;
    establish the reverse channel audio session for transmitting audio content to the source device based at least in part on the at least one reverse channel audio transmission parameter; and
    stream the audio content to the source device using the reverse channel audio session.

8. The apparatus of claim 7, wherein receive the first message comprises:
    receive a first request message from the source device comprising a request for reverse channel audio transmission parameters supported by the source device.

9. The apparatus of claim 7, wherein the instructions are further executable by the processor to:
    receive a second request message from the source device conveying an indication a selected one of the at least one supported reverse channel audio transmission parameters; and
    transmit a confirmation message to the source device, wherein establish the reverse channel audio session based at least in part on the at least one reverse channel audio transmission parameter comprises establish the reverse channel audio session according to the selected one of the at least one supported reverse channel audio transmission parameters.

10. The apparatus of claim 7, wherein the instructions are further executable by the processor to:
transmit a third request message to the source device prior to receiving the first message, the first third request message comprising a request to setup the reverse channel audio session, the first request message indicating one or more transmission parameters associated with an input type, a transport type, and a preferred audio format supported by the sink device.

11. The apparatus of claim 7, wherein the instructions are further executable by the processor to:
receive a session teardown request message from the source device; and
teardown the reverse channel audio session with the source device according to the session teardown request message.

12. The apparatus of claim 7, wherein the instructions are further executable by the processor to:
transmit a session teardown request message to the source device; and
teardown the reverse channel audio session with the source device according to the session teardown request message.

13. The apparatus of claim 7, wherein the unidirectional communication channel comprises a Wi-Fi display (WFC) Miracast session.

14. A method for wireless communication at a source device, comprising:
identifying a unidirectional communication channel with to a sink device from the source device, the unidirectional communication channel being associated with a first streaming session from the source device to the sink device;
transmitting a first message to the sink device from the source device via the unidirectional communication channel;
receiving, responsive to transmitting the first message, a second message that indicates at least one reverse channel audio transmission parameter supported by the sink device for establishing a reverse channel audio session with the source device;
and receiving the reverse channel audio transmissions from the sink device based at least in part on the at least one reverse channel audio transmission parameter.

15. The method of claim 14, wherein transmitting the first message comprises:
transmitting a first request message to the sink device, the first request message comprising a request for reverse channel audio transmission parameters supported by the sink device.

16. The method of claim 14, further comprising: transmitting a second request message to the sink device conveying an indication of a selected one of the at least one supported reverse channel audio transmission parameters; and
receiving a confirmation message from the source device.

17. An apparatus for wireless communication at a source device comprising:
a processor;
memory in electronic communication with the processor; and instructions stored in the memory and operable, when executed by the processor, to cause the apparatus to:
identify a unidirectional communication channel with to a sink device from the source device, the unidirectional communication channel being associated with a first streaming session from the source device to the sink device;
transmit a first message to the sink device from the source device via the unidirectional communication channel;
receive, responsive to transmitting the first message, a second message that indicates at least one reverse channel audio transmission parameter supported by the sink device for establishing a reverse channel audio session with the source device; and
receive the reverse channel audio transmissions from the sink device based at least in part on the at least one reverse channel audio transmission parameter.

18. The apparatus of claim 17, wherein transmit the first message comprises transmit a first request message to the sink device, the first request message comprising a request for reverse channel audio transmission parameters supported by the sink device.

19. The apparatus of claim 17, wherein the instructions are further executable by the processor to:
transmit a second request message to the sink device conveying an indication of a selected one of the at least one supported reverse channel audio transmission parameters;
and receive a confirmation message from the source device.

20. The apparatus of claim 17, wherein the instructions are further executable by the processor to:
receive a session teardown request message from the sink device; and
teardown the reverse channel audio transmission session with the sink device according to the session teardown request message.

21. The apparatus of claim 17, wherein the instructions are further executable by the processor to:
transmit a session teardown request message to the sink device; and
teardown the reverse channel audio transmission session with the sink device according to the session teardown request message.

22. The apparatus of claim 17, wherein the unidirectional communication channel comprises a Wi-Fi display (WFD) Miracast session.

* * * * *